No. 892,340.
PATENTED JUNE 30, 1908.
W. J. WATSON.
CULTIVATOR.
APPLICATION FILED DEC. 19, 1907.
2 SHEETS—SHEET 2.
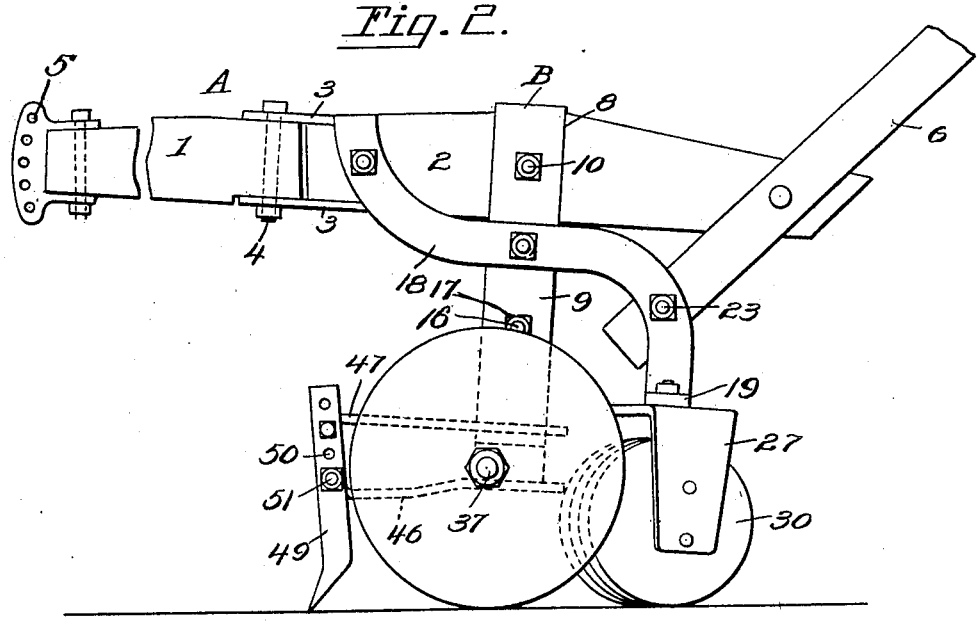
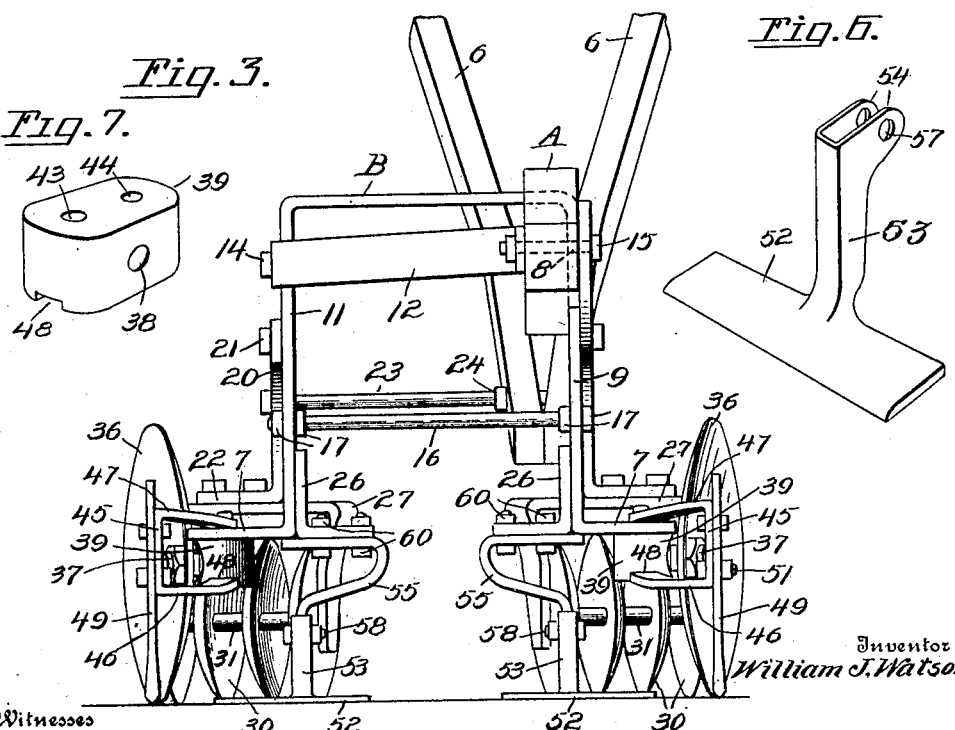
Witnesses
F. C. Gibson.
C. Bradway.
Inventor
William J. Watson
By Victor J. Evans
Attorney

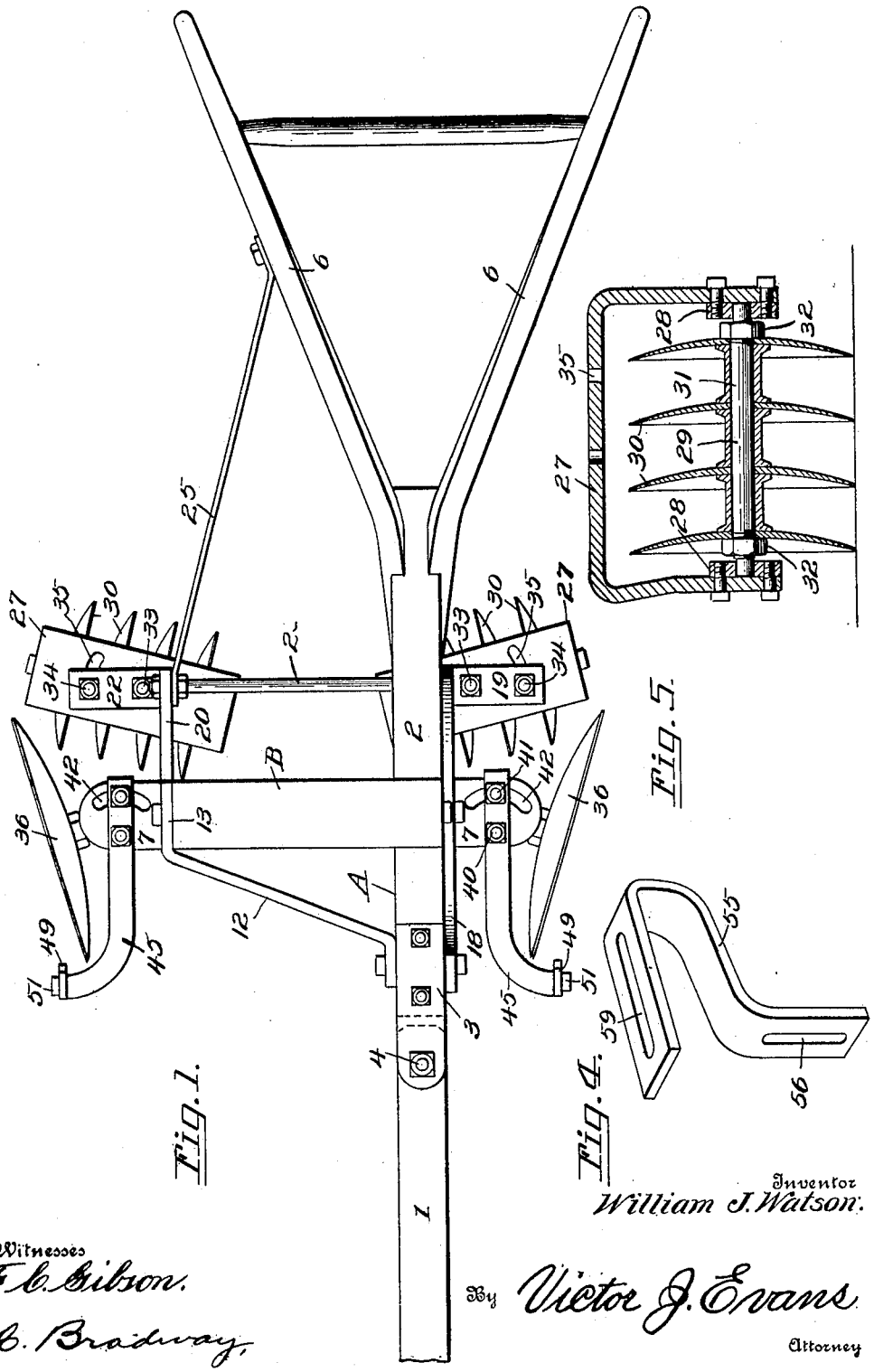

UNITED STATES PATENT OFFICE.

WILLIAM J. WATSON, OF LUCAMA, NORTH CAROLINA.

CULTIVATOR.

No. 892,340.  Specification of Letters Patent.  Patented June 30, 1908.

Application filed December 19, 1907. Serial No. 407,181.

*To all whom it may concern:*

Be it known that I, WILLIAM J. WATSON, a citizen of the United States, residing at Lucama, in the county of Wilson and State of North Carolina, have invented new and useful Improvements in Cultivators, of which the following is a specification.

This invention relates to cultivators intended primarily for the cultivation of cotton plants, although, of course, the present cultivator is not limited to this use.

The invention has for one of its objects to improve and simplify the construction and operation of apparatus of this character so as to enable the plants to be cultivated with great thoroughness, despatch and ease, and with less danger of the cultivator becoming choked with vines, stalks and the like, so that the cultivator can be better managed and the likelihood of rooting out the plants minimized.

A further object of the invention is the provision of a cultivator having suitably arranged gangs of rotary disks for working the soil along both sides of a row of plants, and also having larger disks arranged one in advance of each gang of smaller disks and so disposed as to throw the earth outwardly, there being employed clipping blades for cutting down the leaves or grass in advance of the soil-working disks, the various parts being adjustable for different working conditions.

Another object of the invention is to provide a cultivator of the character referred to having a beam composed of hingedly-connected sections for the purpose of permitting the operator to readily control the cultivator to follow the deviations in the rows of plants or to hold the working elements in proper relation to the plants in case the horse that is hitched to the front section of the beam should deviate from a straight course.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a plan view of the cultivator with the front end of the beam broken away. Fig. 2 is a side view thereof. Fig. 3 is a front view of the cultivator. Fig. 4 is a perspective view of one of the supporting brackets for the clipping or chopping blades. Fig. 5 is a sectional view of one of the gangs of disks. Fig 6 is a perspective view of one of the blades. Fig. 7 is a perspective view of a block for supporting one of the main rotary disks.

Similar reference characters are employed to designate corresponding parts throughout the several views.

Referring to the drawings, A designates the beam which is composed of front and rear sections 1 and 2 respectively, connected by a hinge joint, the joint consisting of plates 3 bolted to the top and bottom sides of the section 2 and projecting forwardly therefrom to receive between them the rear end of the section 1, and passing through the plates and said latter section is a bolt 4 that serves as a pivot on which the rear section can be swung to the right or left for the purpose of following deviations in the rows of plants. The front end of the section 1 is provided with a device 5, whereby a horse can be hitched to the cultivator by a clevis or the like. Attached to the rear end of the section 2 of the beam are the usual handles 6 whereby the operator can control the movement of the cultivator.

On the rear section 2 of the beam is an inverted U-shaped frame B consisting of a metal bar bent into the appropriate shape and having its extremities 7 bent outwardly in opposite directions and disposed in a horizontal plane. The section 2 is provided with a recess 8 into which the right hand arm 9 of the frame B is set, and the frame is secured in position by a bolt 10 passing through the beam and frame. The other arm 11 of the frame B is held in fixed position by a bracket 12 that has its rear end 13 presented to the outside of the arm 11 and secured thereto by a bolt 14, the front end of the bracket being fastened to the section 2 of the beam by a bolt 15. The lower ends of the arms 9 and 10 are rigidly held in fixed relation by a cross bar 16 that passes through apertures in the arms and is provided with nuts 17 for clamping the parts firmly together.

As shown in Fig. 2, an S-shaped member or bar 18 is bolted or otherwise suitably secured to the arm 9 and section 2 of the beam, and the rear lower end is bent outwardly to form a lug 19. On the side of the frame B opposite from the side carrying the S-shaped bar 18 is an arcuate or quadrant member 20 which, as shown in Figs. 1 and 3, is bolted at 21 to the arm 11 of the frame B and has its lower end bent outwardly to form a lug 22. The members 18 and 20 are held in fixed relation by a cross-bar 23 which also projects through the lower ends of the handles 6 which are clamped against each other and against the member 18 by a nut 24 on the said cross-rod 23, as shown in Fig. 3. The quadrant member 20 is braced from one of the handles by means of a bar 25 secured respectively, to the handle and cross-bar 23 and this brace 25 coöperates with the brace 12 to hold the right hand end of the frame B and adjacent parts rigidly in position so as to withstand the strains and shocks brought to bear upon them. Secured to the lower ends of the arms 9 and 11 of the frame B are L-shaped brackets 26 having their lower extremities projecting inwardly toward each other from the arms and disposed in the same plane with the lugs or extremities 7 on the frame B. The foregoing structure constitutes the framework of the cultivator which carries the adjustable soil-working elements.

Carried by the lugs 19 and 22 are inverted U-shaped pivotally-mounted frames 27, each of which, as shown in Fig. 5, has bearings 28 for receiving the spindle or axle 29. On each axle 29 are arranged a gang of rotary concaved disks 30 that are held apart by spacers or sleeves 31 and are clamped to the axle by nuts 32 which screw home against the outermost disks and thus clamp the spacers and disks firmly to the axle to rotate therewith. The frames 27 are disposed under the supporting lugs 19 and 22 and are pivotally secured to the lugs by bolts 33, and the frames are held in adjusted position by clamping bolts 34 that pass through the lugs and through slots 35 struck around the apertures through which the pivots 33 extend. By this means, the gangs can be independently adjusted for the desired working conditions. Located in advance of each gang of disks is a large disk 36 that serves to throw the soil outwardly from the row of plants and for the purpose of cutting off clods of soil and move them out of the way of the smaller disks 30. Each disk 36 is mounted to turn on a bolt 37 that extends through the horizontal aperture in a block 39, the said block being bolted to the under side of one of the lugs or extremities 7 of the frame B. The blocks 39 are mounted on vertical pivots or bolts 40 and are clamped in adjusted position by bolts 41 that extend through slots 42 in the lugs 7, the bolts 40 and 41 passing through the apertures 43 and 44 respectively of the block 39, Fig. 7. Attached to the blocks 39 are forwardly-extending brackets 45 that have their front ends curved outwardly in a lateral direction. These brackets are composed of strips of metal doubled to form horizontal arms 46 and 47, the former being set into recesses 48 in the bottom surfaces of the blocks 39, while the latter are disposed over the lugs 7 of the frame B. These brackets are secured in position and are adjustable with the blocks by means of the bolts 40 and 41. On the outer extremities of these brackets are fenders or teeth 49 that serve to turn vines, stalks and the like out of the path of the disks and at the same time, insure level running of the machine. The teeth 49 have spaced apertures 50 for receiving bolts 51 for securing the teeth to the brackets, the apertures providing for vertical adjustment of the teeth so that the depth of penetration can be regulated, the furrows formed by the teeth permitting the disks to readily follow. In front of the gangs of smaller disks are clipping blades 52 which are adapted to penetrate the soil and cut down the weeds and grass without, however, leaving the soil unlevel. The blades are disposed horizontally and are provided with upstanding shanks 53. The shanks are formed with spring lugs 54, as shown in Fig. 6, between which lugs project the lower ends of adjustable supporting members 55.

As shown in Fig. 4, the lower vertically-extending end of each supporting member 55 has a vertically-extending slot 56 which registers with the apertures 57, Fig. 6, of the lugs 54 and clamping bolts 58 pass through the said apertures and slots of the parts so as to clamp them in position, the slots permitting of the blades 52 being adjusted to vary the depth of penetration. The supporting members 55 have their upper extremities disposed horizontally and presented to the under side of the brackets 26, and these extremities are provided with longitudinal slots 59 through which pass the bolts 60 for securing the members 55 to the brackets 26 and the slots permit the said members and blades 52 to be adjusted toward or away from each other. Under some conditions, it might be preferable to operate the cultivator without the blades 52 and these can be taken off by removing the bolts 58, whereupon the shanks 53 can be slipped off the lower ends of the members 55. The blades cut the weeds and grass which might not otherwise be affected by the disks 30, and they also loosen the soil so that the disks can more readily throw the loosened soil inwardly toward the plants.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having thus described the invention, what I claim is:—

1. In a cultivator, the combination of a supporting structure, a plurality of gangs of rotary disks spaced from each other, means for adjustably mounting the gangs on the structure, adjustable disks supported in front of the gangs and arranged to throw soil oppositely from the gangs, fenders disposed in front of the last-mentioned disks and adjustable therewith, and vertically-adjustable clipping blades mounted on the structure in front of the said gangs.

2. In a cultivator, the combination of a beam, a transversely-extending frame having depending arms, means for mounting one arm on the beam, devices for bracing the other arm, rotary disks adjustably mounted on the lower ends of the arms, rearwardly-extending members secured to the arms, adjustable frames on the members, and gangs of disks mounted on said adjustable frame in a position behind the first-mentioned disks.

3. In a cultivator, the combination of a beam composed of jointed sections, handles connected with the rear section, gangs of disks adjustably mounted and arranged in spaced relation on the rear section, a disk adjustably mounted on the said rear section in front of one of the gangs, and adjustable clipping blades supported on the rear section and disposed in front of the gangs.

4. In a cultivator, the combination of a beam, an inverted U-shaped frame having one arm mounted directly on the beam, a bracket on each arm, clipping blades adjustably mounted on the brackets, a block on each arm and adjustable on a vertical pivot, a disk rotatably mounted on each block and adjustable with the latter, a fender on each block and disposed in front of the adjacent disk and adjustably mounted, and means for bracing the outer arm on the beam.

5. In a cultivator, the combination of an inverted U-shaped frame having arms provided with horizontally-bent extremities, a rod secured at its ends to and carried by both arms and rigidly holding the latter in spaced relation, members pivotally mounted on the extremities to turn on vertical axes, means for securing the members in adjusted position, disks rotatably mounted on the members and adjustable therewith, forwardly-projecting arms on the members and adjustable therewith, and fender elements on the members and disposed in front of the disks.

6. In a cultivator, the combination of a supporting structure, laterally-extending members thereon and provided with slots, blocks, pivots between the blocks and members, bolts extending through the slots for connecting the members and blocks in fixed relation, disks rotatably mounted on the blocks and adjustable therewith, arms secured to the blocks by the bolts and adjustable with the blocks, and vertically-adjustable teeth secured to the outer extremities of the arms and disposed in front of the disks.

7. In a cultivator, the combination of a beam, a frame having vertically-extending arms, the extremities of the arms being bent laterally, rotary disks, fender elements disposed in front of the disks, common means for adjustably mounting a disk and an element on each extremity, clipping blades adjacent each disk, members adjustable horizontally on the arms, and means for vertically adjusting the blades on the members.

8. In a cultivator, the combination of a beam composed of hingedly connected sections, a frame having depending arms, means for securing one arm to the rear section of the beam, a brace between the other arm and beam, a rod carried by the arms and bracing one arm on the other, soil-working elements on the lower extremities of the arms, members mounted on and extending rearwardly from the arms, handles connected with the beams, a cross-bar between the members for holding them in fixed relation, means for clamping the handles to the cross bar, a brace between the cross bar and one of the handles, and soil-working elements adjustably mounted on the said members.

9. In a cultivator, the combination of a beam, an inverted U-shaped frame mounted on the beam, means for bracing the frame on the beam, disks adjustably mounted on the frame, fenders mounted on the frame and disposed in front of the disks, rearwardly extending members connected with the frame, a gang of disks on each member, a cross bar rigidly connected with the members, handles secured to the beam, means for clamping the handles to the cross bar and against one of the said members, and a brace between one of the handles and cross bar for holding the frame rigidly in position.

In testimony whereof I affix my signature in presence of two witnesses.

WILLIAM J. WATSON.

Witnesses:
K. W. BARNES,
N. B. BRAY.